Feb. 14, 1961 C. PAVIA 2,971,679
APPARATUS FOR PROCESSING MATERIALS
Filed Nov. 28, 1958
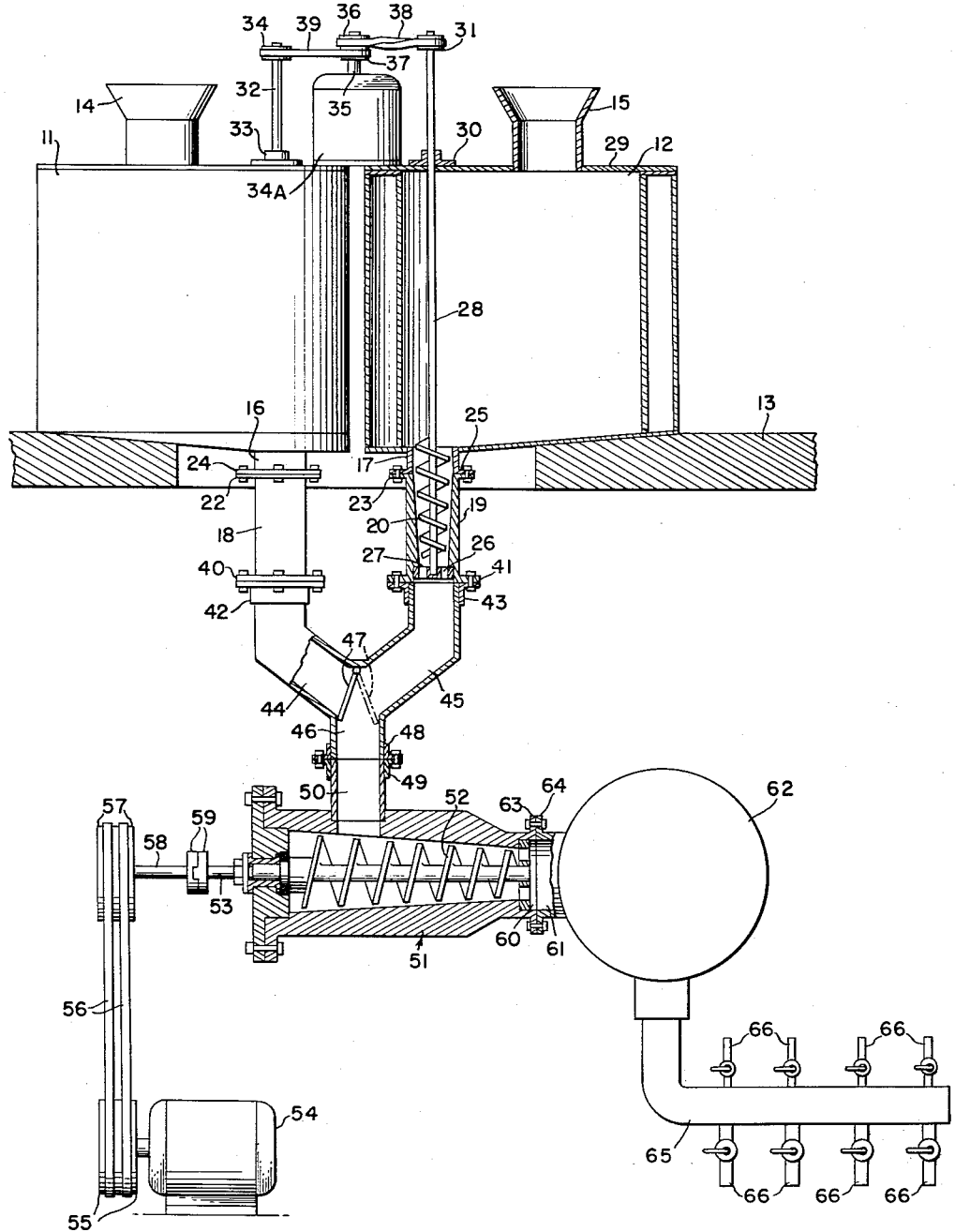
INVENTOR.
CHARLES PAVIA
BY
Albert J. Kramer
ATTORNEY 2,971,679
Patented Feb. 14, 1961

2,971,679

APPARATUS FOR PROCESSING MATERIALS

Charles Pavia, Timberville, Va.

Filed Nov. 28, 1958, Ser. No. 777,034

4 Claims. (Cl. 222—142)

This invention relates to the processing of materials and it is more particularly concerned with apparatus for processing a plurality of ingredients of a final composition, such as meat products, especially sausage, balogna, and similar products.

The general object of the invention is the provision of apparatus for receiving the ingredients of the final composition in a coarse state of subdivision, mixing them and continuously feeding the mixed ingredients under constant pressure to units of the apparatus for further processing.

Another object of the invention is the provision of such an apparatus which, after receiving the ingredients of the final product, moves them in a closed system without exposure to the atmosphere or foreign objects or to human handling until the final composition is in package form. This is of particular importance in the manufacture of edible sausage type products where a continuous flow of material is desirable as well as a constant pressure on the stuffing cocks of the linkers, and where the possibilities of contamination should be reduced to a minimum.

A further object of the invention is the provision of such an apparatus which is easy to keep sanitary and which reduces to a minimum the possibilities of contamination from extraneous sources.

A still further object of the invention is the provision of a method for processing the ingredients for a composition of matter to provide for a high degree of dispersion of the ingredients among themselves so as to obtain a final product having an extremely high degree of homogeneity.

These objects and still further objects, advantages and features of the invention will appear more fully from the following description, considered along with the drawing which accompanies it and to which reference is hereinafter made.

In the drawing:

The figure is a schematic diagram, partly cut away, showing an embodiment of the invention with parts in section.

Referring with more particularity to the drawing, the embodiment illustrated comprises two mixing tanks 11 and 12 which may be mounted side by side on the upper floor 13 of a building, such as a processing plant.

These mixing tanks contain any of the ordinary paddles or other mixing members (not shown) known in the art. Hoppers 14 and 15, respectively, are provided for loading the tanks. The materials are fed to the tanks alternatively so that while one tank is being filled, the other may be emptied.

Outlet pipes 16 and 17, respectively, are provided for the tanks at the bottoms thereof. To each of these outlet pipes there is removably attached a hollow housing 18 and 19, respectively, for a vertical conveyor screw, such as the conveyor screw 20 in housing 19, the other conveyor screw, not being shown, is identical to the conveyor screw 20. The upper ends of the housings 18 and 19 are provided with coupling flanges 22 and 23 for attachment to the coupling flanges 24 and 25 of the outlet pipes 16 and 17, respectively. At the bottom of each housing 18 and 19 there is secured a spider, such as the spider 26 for the housing 19, having a central thrust bearing 27 for rotatably supporting the lower end of the vertical shaft 28 of the conveyor screw.

The shaft 28 extends upward through the top 29 of the tank 12 and is rotatably held in bearing 30. Additional bearings may be provided for the shaft 28, if desired. The upper end of the shaft 28 extends above the bearing 30 and is provided with a pulley 31.

The tank 11 is provided with similar means, the shaft 32 of its outlet conveyor (not shown) being held in a bearing 33 at the top and the upper end of said shaft 32 being likewise provided with a pulley 34.

A reversible motor 34A is secured to the top of the tanks or to either of them and it has a vertical power take-off shaft 35 between the pulleys 31 and 34. The shaft 35 is provided with two driving pulleys 36 and 37, the pulley 36 being connected to the pulley 31 by a belt 38 and the pulley 37 being connected to the pulley 34 by a belt 39. One of the driving belts is crossed so that the rotation of the motor in either direction will cause the shafts 28 and 32 to rotate in opposite directions.

The lower ends of the housings 18 and 19 are provided with coupling flanges 40 and 41 which are removably connected by bolts to the coupling flanges 42 and 43 of inlet branches 44 and 45 of a Y connector or conduit.

At the junction of the inlet branches 44 and 45 with the lower outlet branch or trunk 46, a freely hinged gate or baffle 47 is mounted. One position of the gate, as shown by the full lines in Fig. 1, permits material to flow from the branch 45 into the trunk 46 and acts as a baffle to block the material from entering the branch 44. In the other position of the gate 47, as shown by the dotted lines in Fig. 1, material may move from the branch 44 into the trunk 46 and the gate blocks any of the flowing material from entering the branch 45. The change from one of these positions of the gate to the other is effected automatically every time the direction of rotation of the motor 34A is changed, because of the positive pressure on one side of the gate and the corresponding negative pressure on the other side due to the feed screws in the housings 18 and 19 working in opposite directions.

The lower end of the trunk 46 is provided with a coupling flange 48 for connection to the coupling flange 49 of an inlet pipe 50 of a pressure feeder 51. This feeder contains a rotatable screw conveyor 52 mounted on a shaft 53 and which is driven by a motor 54 through any suitable means, such as driving pulleys 55, belts 56, and driven pulleys 57 on a shaft 58 connected to the shaft 53 by a coupler or clutch 59.

The outlet 60 of the feeder 51 is removably coupled to the intake 61 of a comminutor 62 by means of coupling flanges 63 and 64 and the outlet of the comminutor 62 is removably connected to the manifold 65 of a linker or other distribution or packaging device that may be adapted to receive the final composition.

In actual operation, material is fed into the hoppers 14 and 15 from a pre-breaking device, such as an ordinary meat grinder, hasher, etc. (not shown) to subdivide into relatively coarse particles the ingredients to be used in formulating the final composition.

The direction of rotation of the motor 34A is changed each time one of the mixing tanks is emptied and the material in the other tank is to be discharged after being thoroughly mixed in the tank. The action of the swinging gate 47 is automatic as explained above. Hence, a continuous operation of the unit is made possible without interruption.

The mixed, coarse particles are then fed to the pressure feeder 51 which discharges the material under pressure to the inlet of the comminutor 62.

The comminutor 62 may be of any of the types known to the art, but it is preferably of the type described in my copending application for Patent Ser. No. 606,117, now abandoned, or the modified type shown in my copending application Ser. No. 726,532. The action of the comminutor on the mixed ingredients in the coarse state of subdivision is to reduce the particle sizes to a very minute and fine state of subdivision resulting in a practically homogeneous composition.

The composition is discharged into the manifold line 65 from which it may be, in the case of sausage type products, for example, be fed to outlet cocks 66 of linkers wherein casings are filled with the composition. Other compositions may be discharged in other ways as may be required.

Having thus described my invention, I claim:

1. A transfer device for a pair of tanks, said tanks having each an outlet for material therein, said device comprising a conduit having an outlet branch and a pair of inlet branches converging to the outlet branch, said inlet branches being connected, respectively, to said tank outlets to receive material discharged from the tanks, a free swinging valve gate in said conduit between said inlet branches, said gate being disposed so as to swing between a position to close one inlet branch and another position to close the other inlet branch, a material conveyor in each of said inlet branches, and means for reversibly actuating said conveyors simultaneously, thereby urging materials within said inlet branches to be conveyed therethrough simultaneously but in opposite directions, respectively, and to cause, by the said movement of the materials therein, the gate to be biased to a position to close one of the inlet branches against material entering therein from the other inlet branch.

2. A transfer device as defined by claim 1 in which the conveyors are feed screws.

3. A transfer device for material in a pair of tanks, said tanks each having an outlet for the material therein, said device comprising a conduit having an outlet branch and a pair of inlet branches converging to the outlet branch, said inlet branches being connected, respectively, to said tank outlets to receive material discharged from the tanks, a free swinging valve gate in said conduit between said inlet branches, said gate being disposed so as to swing between a position to close one inlet branch and another position to close the other inlet branch, a feed screw housing between each tank outlet and its corresponding inlet branch, a feed screw in each of said housings, and means for reversibly actuating said feed screws simultaneously.

4. The combination of a pair of tanks, each tank having an outlet, a feed screw housing connected to each of said outlets, a conveyor screw in each housing, a Y-shaped conduit having its bifurcated end, presented as inlet branches, connected to said housings, respectively, a free swinging valve gate in said conduit between the inlet branches, said gate being disposed so as to swing between a position to close one inlet branch and another position to close the other inlet branch, and means for actuating said conveyor screws for simultaneously urging material in said inlet branches in opposite directions, respectively.

References Cited in the file of this patent

UNITED STATES PATENTS

| | | |
|---|---|---|
| 1,528,887 | Offenhauser | Mar. 10, 1925 |
| 2,111,463 | Steensgaard | Mar. 15, 1938 |
| 2,167,438 | Kaufman | July 25, 1939 |
| 2,394,431 | Curtis et al. | Feb. 5, 1946 |
| 2,668,693 | Gard | Feb. 9, 1954 |
| 2,800,238 | Oliver | July 23, 1957 |